United States Patent
Legagneux et al.

(10) Patent No.: US 12,420,257 B2
(45) Date of Patent: Sep. 23, 2025

(54) SILICON TRAPPING MASS

(71) Applicant: IFP ENERGIES NOUVELLES, Rueil Malmaison (FR)

(72) Inventors: Nicolas Legagneux, Rueil Malmaison (FR); Marie-Claire Marion, Rueil Malmaison (FR); Karin Barthelet, Rueil Malmaison (FR); Patrick Euzen, Rueil Malmaison (FR); Joseph Lopez, Rueil Malmaison (FR)

(73) Assignee: IFP ENERGIES NOUVELLES, Rueil Malmaison (FR)

( * ) Notice: Subject to any disclaimer, the term of this patent is extended or adjusted under 35 U.S.C. 154(b) by 231 days.

(21) Appl. No.: 18/267,965

(22) PCT Filed: Dec. 9, 2021

(86) PCT No.: PCT/EP2021/084889
§ 371 (c)(1),
(2) Date: Jun. 16, 2023

(87) PCT Pub. No.: WO2022/135943
PCT Pub. Date: Jun. 30, 2022

(65) Prior Publication Data
US 2024/0050922 A1    Feb. 15, 2024

(30) Foreign Application Priority Data

Dec. 21, 2020 (FR) .................... 2013845

(51) Int. Cl.
*B01J 20/08* (2006.01)
*B01J 20/28* (2006.01)
*B01J 20/32* (2006.01)
*C10G 25/05* (2006.01)

(52) U.S. Cl.
CPC ......... *B01J 20/08* (2013.01); *B01J 20/28011* (2013.01); *B01J 20/28061* (2013.01); *B01J 20/28083* (2013.01); *B01J 20/2809* (2013.01); *B01J 20/3204* (2013.01); *B01J 20/3236* (2013.01); *C10G 25/05* (2013.01); *C10G 2300/104* (2013.01); *C10G 2300/202* (2013.01); *C10G 2400/02* (2013.01)

(58) Field of Classification Search
CPC ............... B01J 20/08; B01J 20/28011; B01J 20/28061; B01J 20/28083; B01J 20/2809; B01J 20/3204; B01J 20/3236; B01J 20/28057; B01J 20/28078; B01J 20/06; C10G 25/05; C10G 2300/104; C10G 2300/202; C10G 2400/02; C10G 25/003
USPC .............................................. 585/823
See application file for complete search history.

(56) References Cited

U.S. PATENT DOCUMENTS

| | | | | |
|---|---|---|---|---|
| 4,061,594 A | * | 12/1977 | Michel | ...... B01J 20/08 502/355 |
| 5,118,406 A | * | 6/1992 | Kokayeff | ...... C10G 45/08 208/254 R |
| 6,638,888 B1 | | 10/2003 | Peratello et al. | |
| 7,713,408 B2 | | 5/2010 | Breivik et al. | |
| 2018/0237706 A1 | | 8/2018 | Showak et al. | |

FOREIGN PATENT DOCUMENTS

EP    0748652 A1    12/1996

OTHER PUBLICATIONS

International search report PCT/EP2021/084889 dated Jan. 10, 2022 (pp. 1-2).
Patrick Euzen et al: "Alumina" In: "Handbook of Porous solids", (Apr. 25, 2008), Wiley-VCHVerlag GmbH, KP055057945, ISBN: 978-3-52-761828-6; pp. 1591-1677, DOI: 10.1002/9783527618286. ch23b.

\* cited by examiner

*Primary Examiner* — Prem C Singh
*Assistant Examiner* — Francis C Campanell
(74) *Attorney, Agent, or Firm* — Millen, White, Zelano & Branigan; Brion P. Heaney

(57) ABSTRACT

The present invention relates to a mass for trapping silicon compounds, comprising a porous alumina-based support and at least one metal chosen from the metals from groups VIB and VIIIB, and exhibiting a grain density of at least 1.20 g/ml, a specific surface of at least 300 m²/g and pores with a mean size of less than 6.5 nm, as determined by mercury porosimetry. The present invention also relates to a process for the preparation of said trapping mass and to a trapping process using said trapping mass.

20 Claims, No Drawings

SILICON TRAPPING MASS

TECHNICAL FIELD

The present invention relates to a process for the removal of silicon compounds, and in particular of organosilicon compounds, from gaseous or liquid hydrocarbon feedstocks on a trapping mass.

PRIOR ART

Certain hydrocarbon feedstocks are likely to contain impurities which can be poisons for the catalysts which have to be employed to refine them. Sulfur and nitrogen are impurities very often present in feedstocks resulting from oil refining but also those resulting, for example, from the combustion of solid feedstocks, such as, for example, biomass, waste or also a mixture of plastics. These feedstocks can also contain silicon, which is a poison for many catalysts, such as, for example, those of hydrogenation, hydrotreating and catalytic reforming.

For example, one of the sources of contamination of hydrocarbon feedstocks by silicon is the addition of defoamers to the feedstocks before their treatment. This is because certain processes employed in petroleum processes (stirring, distillation, combustion, cracking) used during the refining of crude oil can result in the formation of emulsions. This is the case, for example, during the generation of vapors and in the presence of natural surfactants (asphaltenes and resins). However, the presence of foams can cause many operating and maintenance problems and detrimentally affect the efficiency. Defoamers are often based on silicon, more generally called silicones, because of their surface properties and their relative thermal stability, the most widely used in the petroleum industry being polydimethylsiloxane or PDMS. Despite a high thermal stability, the temperature 300° C.) within the refining processes nevertheless leads to a degradation of the polymer to give a mixture of lighter organosilicon compounds. In the case of PDMS, the predominant degradation compounds are cyclic siloxanes (see, for example, G. Camino, S. M. Lomakin and M. Lazzari, "Polydimethylsiloxane Thermal Degradation Part 1. Kinetic Aspects", Polymer, 2001, 42(6), pp. 2395-2402). Other types of compounds can be formed, such as, for example, silanols and linear siloxanes.

In addition, the places where a defoamer is likely to be added are during extraction of the oil, before the hydrocarbon feedstock enters the distillation column, in the thermal cracking (coking, visbreaking and steam cracking) or propane desalphalting units.

The amounts of silicon found in the various effluents upstream of these units depend on their number and the cut points chosen. For example, a silicon content which can reach 50 ppm by weight is measured in gasoline cuts resulting from coking units (coker naphtha), on average from 10 to 15 ppm by weight.

The silicon can exist in two distinct forms:
"mineral" silicon, which can result, for example, from debris from refractory beads or plastic additives. It is present physically but does not seem to be bound to disturb the activity or the selectivity of the catalyst concerned; and
silicon usually referred to as organic. The silicon is then included in organosilicon compounds. Said silicon can react with the surface groups of the catalysts, in particular with surface hydroxyls (see, for example, L. Kellberg, P. Zeuthe and H. J. Jakobsen, "Deactivation of HDT catalysts by formation of silica gels from silicone oil, characterization of spent catalysts from HDT of coker naphtha using Si and C CP-MAS NMR", Journal of Catalysis, 1993, 143(1), pp. 45-51), which results in an irreversible poisoning of the catalysts.

Thus, to avoid the poisoning of the catalysts, it is desired to remove or at least reduce the concentration of silicon, in particular in organic form, in the hydrocarbon feedstocks to be refined.

Industrially, to protect catalysts at risk of being poisoned by silicon, a dedicated trapping mass is positioned upstream of said catalysts. The silicon-polluted feedstock will thus be brought into contact beforehand with this mass before being brought into contact with the catalysts to be protected. Said contact with the trapping mass can be carried out in a first bed placed before the bed or beds of catalysts to be protected. Said contact can also be carried out in an independent dedicated enclosure, such as described, for example, in the patent EP 1 925 654. The effluent resulting from this stage of trapping of the organosilicon compounds is then purified.

The U.S. Pat. No. 5,118,406 describes the sequence of two catalysts based on refractory oxide containing at least one metal from group VIB and/or at least one metal from group VIIIB and at least one compound based on phosphorus. The first catalyst, which is less active and which exhibits a greater available surface area because of a lower charge of metals, is rather intended for the removal of silicon and the second, which is more active and which exhibits a smaller available surface area because of a greater charge of metals, is rather employed for the hydrotreating. The U.S. Pat. No. 5,118,406 also describes the use of a support based on essentially gamma alumina having as characteristic a total pore volume of greater than 0.2 cc/g constituted to at least 75% of pores with a size of between 5 and 11 nm, with pores with a mean diameter of between 6.5 and 9 nm and with $S_{BET}>100$ m$^2$/g.

The patent US 2018/237706 describes a Si trapping mass also based on inert alumina with less than 1% by weight of a metal from group VIIIB (group 8, 9, 10) and/or less than 5% by weight of a metal from group 6. The recommended support has an $S_{BET}>250$ m$^2$/g, pore sizes of between 7 and 12 nm and must be shaped with a diameter of less than 1.6 mm in order to avoid diffusion problems.

In order to be able to provide the best protection to the downstream catalysts and to ensure that they maintain their performance qualities (activity and/or selectivity) for as long as possible, it is a question of employing the most capacitive trapping mass possible.

SUMMARY OF THE INVENTION

In the context described above, a first object of the present description is to overcome the problems of the prior art and to provide an improved process for trapping silicon compounds and in particular organosilicon compounds.

In the context described above, according to a first aspect, the abovementioned objects, and also other advantages, are obtained by a mass for trapping silicon compounds, comprising a porous alumina-based support and at least one metal chosen from the metals from groups VIB and VIIIB, and exhibiting a grain density of at least 1.20 g/ml, a specific surface of at least 300 m$^2$/g and pores with a mean size of less than 6.5 nm.

The applicant company has developed trapping masses comprising a support with specific textural properties and preferably with improved metal contents, resulting in an enhancement in the performance qualities in trapping silicon compounds and in particular organosilicon compounds. Specifically, the applicant company has identified, surprisingly, that a trapping mass according to the invention, comprising a porous alumina-based support and at least one metal chosen from the metals from groups VIB and VIIIB, and exhibiting a grain density of at least 1.20 g/ml, a specific surface of at least 300 m$^2$/g and pores with a mean size of less than 6.5 nm, exhibits an improved trapping capacity. The applicant company has also identified the use of a trapping mass according to the invention, the synthetic support of which is based essentially on alumina, with particular textural properties, including a grain density of greater than 1.15 g/ml and preferably of greater than 1.2 g/ml, a specific surface of greater than 330 m$^2$/g and pores with a mean size of less than 6.5 nm, also exhibits an improved trapping capacity.

According to one or more embodiments, the trapping mass exhibits a grain density of at least 1.25 g/ml.

According to one or more embodiments, the trapping mass exhibits a specific surface of at least 310 m$^2$/g.

According to one or more embodiments, the trapping mass exhibits pores with a mean size of less than or equal to 6.0 nm.

According to one or more embodiments, the trapping mass exhibits a monomodal pore size distribution.

According to one or more embodiments, the trapping mass exhibits a content of less than 10% by weight of metal from group VIB, expressed as oxide, and/or a content of less than 5% by weight of metal from group VIIIB, expressed as oxide.

According to one or more embodiments, the trapping mass exhibits a content of less than 15% by weight of P, expressed as oxide $P_2O_5$.

According to one or more embodiments, the trapping mass exhibits a total pore volume of between 0.15 cm$^3$/g and 0.6 cm$^3$/g.

In the context described above, according to a second aspect, the abovementioned objects, and also other advantages, are obtained by a process for the preparation of a mass for trapping silicon compounds, comprising the following stages:
a) a porous alumina-based support exhibiting a grain density of at least 1.15 g/ml, a specific surface of at least 330 m$^2$/g and pores with a mean size of less than 6.5 nm is provided;
b) an aqueous solution containing at least one dissolved metal M precursor, the metal M being chosen from the metals from groups VIB and VIIIB, is prepared;
c) the solution obtained on conclusion of stage b) is impregnated on the porous support resulting from stage a);
d) the impregnated support resulting from stage c) is allowed to mature;
e) the solid resulting from stage d) is dried.

According to one or more embodiments, the porous support exhibits a grain density of at least 1.20 g/ml.

According to one or more embodiments, the porous support exhibits a specific surface of at least 340 m$^2$/g.

According to one or more embodiments, the porous support exhibits pores with a mean size of less than or equal to 6.0 nm.

According to one or more embodiments, the trapping mass comprises a porous alumina-based support and at least one metal chosen from the metals from groups VIB and VIIIB, and exhibiting a grain density of at least 1.20 g/ml, a specific surface of at least 300 m$^2$/g and pores with a mean size of less than 6.5 nm.

In the context described above, according to a third aspect, the abovementioned objects, and also other advantages, are obtained by a process for trapping silicon compounds in a gaseous or liquid feedstock by bringing the feedstock into contact with a trapping mass according to the first aspect or a trapping mass obtainable or prepared by the process according to the second aspect.

According to one or more embodiments, the contacting operation is carried out at a temperature of between 20° C. and 500° C., an absolute pressure of between 0.1 MPa and 20 MPa, and a liquid hourly space velocity of between 0.1 h$^{-1}$ and 50 h$^{-1}$ or a gas hourly space velocity of between 10 h$^{-1}$ and 5000 h$^{-1}$.

Embodiments according to the abovementioned aspects and also other characteristics and advantages will become apparent on reading the description which will follow, given solely by way of illustration and without limitation.

DESCRIPTION OF THE EMBODIMENTS

Embodiments of the invention will now be described in detail. In the following detailed description, many specific details are presented in order to provide a deeper understanding of the invention. However, it will be apparent to a person skilled in the art that the invention can be implemented without these specific details. In other cases, well-known characteristics have not been described in detail in order to avoid unnecessarily complicating the description.

Definitions

The textural and structural properties of the trapping mass are determined by the characterization methods known to a person skilled in the art.

In the account which follows of the invention, specific surface is understood to mean the BET specific surface determined by nitrogen adsorption in accordance with the standard ASTM D 3663-78 drawn up from the Brunauer-Emmett-Teller method described in the journal "The Journal of the American Chemical Society", 60, 309 (1938).

The pore volume, the grain density, the mean size (or mean diameter) of the pores and the pore distribution are determined by mercury porosimetry (see Schüth F., Sing K. and Weitkamp J. "Handbook of Porous Solids; Chapter 2.7: Mercury Porosimetry", pp. 309-350, Wiley-VCH, 2002; see Rouquerol F., Rouquerol J. and Sing K., "Adsorption by Powders and Porous Solids: Principles, Methodology and Applications", Academic Press, 1999). More particularly, the pore volume (the grain density, the mean size of the pores and the pore distribution) is measured by mercury porosimetry according to the standard ASTM D4284-92 with a wetting angle of 140°, for example using an Autopore III™ model device of the Micromeritics™ brand.

In the mercury porosimetry technique, Kelvin's law is applied, which law gives the relationship between the pressure, the diameter of the smallest pore into which the diameter penetrates at said pressure, the wetting angle and the surface tension according to the following formula in which Ø represents the diameter of the pore (nm), t the surface tension (48.5 Pa), θ the contact angle (θ=140 degrees) and P the pressure (MPa): $Ø=(4t \cos θ) \cdot 10/P$ Subsequently, the groups of chemical elements are given according to the CAS classification (CRC Handbook of Chemistry and Physics, published by CRC Press, editor-in-chief D. R. Lide, 81st edition, 2000-2001). For example, group VIIIB according to the CAS classification corresponds to the metals from columns 8, 9 and 10 according to the new IUPAC classification; group VIB according to the CAS classification corresponds to the metals from column 6 according to the new IUPAC classification.

In the present patent application, the term "to comprise" is synonymous with (means the same thing as) "to include" and "to contain", and is inclusive or open and does not exclude other uncited elements. It is understood that the term "to comprise" includes the exclusive and closed term "to consist". The term "based on" is synonymous with "comprises at least 50% by weight of". By default, the percentages given are % by weight. In addition, in the present description, the terms "essentially" or "substantially" correspond to an approximation of ±5%, preferably of ±1%, very preferably of ±0.5%. For example, an effluent comprising essentially or consisting of compounds A corresponds to an effluent comprising at least 95% by weight of compounds A.

The contents of metals from group VIIIB and from group VIB and of phosphorus are measured by X-ray fluorescence. The contents of metal from group VIB, of metal from group VIIIB and of phosphorus in the trapping mass are expressed as oxides after correction for the loss on ignition of the catalyst sample at 550° C. in a muffle furnace for two hours. The loss on ignition is due to the loss of moisture. It is determined according to ASTM D7348.

Embodiments

The present invention relates to a mass for trapping organosilicon complexes, present in gaseous or liquid hydrocarbon cuts, to a process for the preparation of said trapping mass, and also to its use for the treatment of hydrocarbon cuts and in particular for the removal of organosilicon complexes.

The trapping mass according to the invention comprises a porous support based essentially on alumina, at least one metal among the metals from groups VIB and VIIIB. The metal(s) from group VIB are preferably chosen from molybdenum and tungsten. The metal(s) from group VIIIB are preferentially chosen from iron, cobalt and nickel. According to one or more embodiments, the trapping mass according to the invention comprises a metal among the metals from group VIB and a metal among the metals from group VIIIB. According to one or more embodiments, the trapping mass according to the invention comprises nickel and molybdenum.

According to one or more embodiments, the content of metal from group VIB, expressed as oxide, is less than 10% by weight, with respect to the total weight of the trapping mass. According to one or more embodiments, the content of metal from group VIB, expressed as oxide, is of between 0.1% and 10% by weight, preferably between 1% and 7% by weight and more preferably between 2% and 5% by weight. Preferably, the content of metal from group VIB, expressed as oxide, is greater than 3% by weight and less than 4% by weight, such as between 3.1% and 3.9% by weight, with respect to the total weight of the trapping mass.

According to one or more embodiments, the content of metal from group VIIIB, expressed as oxide, is less than 5% by weight, with respect to the total weight of the trapping mass. According to one or more embodiments, the content of metal from group VIIIB, expressed as oxide, is of between 0.01% and 5% by weight, preferably between 0.1% and 3% by weight and more preferably between 0.2% and 1% by weight. Preferably, the content of metal from group VIIIB, expressed as oxide, is greater than 0.5% by weight and less than 1% by weight, such as between 0.6% and 0.95% by weight, with respect to the total weight of the trapping mass.

According to one or more embodiments, the trapping mass according to the invention advantageously comprises at least one phosphorus compound. According to one or more embodiments, the content of phosphorus, expressed as oxide $P_2O_5$, is less than 15% by weight, with respect to the total weight of the trapping mass. According to one or more embodiments, the content of P, expressed as oxide $P_2O_5$, is of between 0.1% and 15% by weight, preferably between 0.05% and 10% by weight and more preferably between 0.1% and 7% by weight, such as between 0.2% and 5% by weight or also between 0.5% and 3% by weight, with respect to the total weight of the trapping mass.

According to the invention, the trapping mass has a specific surface of at least 300 $m^2/g$, preferably of at least 310 $m^2/g$. According to one or more embodiments, the trapping mass exhibits a specific surface of between 310 $m^2/g$ and 400 $m^2/g$, preferably between 315 $m^2/g$ and 330 $m^2/g$, such as 320±3 $m^2/g$.

According to the invention, the trapping mass has a grain density of at least 1.20 g/ml and preferably of at least 1.25 g/ml. According to one or more embodiments, the trapping mass exhibits a grain density of between 1.25 g/ml and 1.60 g/ml or between 1.25 g/ml and 1.50 g/ml, preferably between 1.30 g/ml and 1.40 g/ml, such as 1.35±3 g/ml.

According to the invention, the pores of the trapping mass have a mean size (or mean diameter) of less than 6.5 nm, preferably of less than or equal to 6 nm. According to one or more embodiments, the pores of the trapping mass exhibit a mean size of between 1 nm and 6 nm, preferably between 3 nm and 6 nm, very preferably between 5 and 6 nm (e.g. between 5.5 and 5.9 nm).

According to one or more embodiments, the trapping mass has a monomodal pore size distribution. According to one or more embodiments, the pores of the trapping mass having a mean size of less than 6.5 nm, preferably of less than or equal to 6 nm, preferably between 1 nm and 6 nm, exhibit a monomodal pore size distribution.

According to one or more embodiments, the trapping mass has a total pore volume (TPV) of between 0.15 $cm^3/g$ and 0.6 $cm^3/g$, preferably between 0.2 $cm^3/g$ and 0.5 $cm^3/g$. According to one or more embodiments, at least 80%, preferably at least 85% and more preferably still at least 90% of the total pore volume corresponds to the volume of the pores with a diameter of less than 10 nm.

According to one or more embodiments, the trapping mass is provided in the form of extrudates of cylindrical, hollow cylinder, cartwheel, trilobe or multilobe shape or any other geometric shape used by a person skilled in the art. According to one or more embodiments, the trapping mass exhibits a diameter of between 0.5 and 10 mm, preferably between 0.8 and 3.2 mm, and/or a length of between 1 mm and 20 mm, preferably between 1 and 10 mm, in particular when the trapping mass is employed in a fixed bed.

According to one or more embodiments, the trapping mass is provided in the bead form. According to one or more embodiments, the trapping mass exhibits a diameter of between 0.5 and 10 mm, preferably between 0.8 at 3.2 mm.

According to the invention, the porous support used for the preparation of the trapping mass is based on alumina. According to one or more embodiments, the porous support is essentially alumina. According to one or more embodiments, the porous support is based on transition alumina. According to one or more embodiments, the porous support consists essentially of transition alumina.

According to one or more embodiments, the alumina(s) of the porous support used for the preparation of the trapping mass are of $\chi$, $\eta$, $\gamma$ or $\delta$ type. Preferably, they are of $\gamma$ or $\delta$ type. More preferably still, they are of $\gamma$ (gamma) type.

According to one or more embodiments, the porous support consists essentially of a plurality of juxtaposed agglomerates.

According to one or more embodiments, the porous support used for the preparation of the trapping mass comprises aluminum oxide hydroxide not converted into transition alumina.

According to one or more embodiments, the porous support comprises less than 10% by weight, preferably less than 5% by weight, very preferably less than 1% by weight, of aluminum oxide hydroxide. According to one or more embodiments, the porous support does not contain aluminum oxide hydroxide.

The porous support used for the preparation of the trapping mass has a specific surface of at least 330 m$^2$/g, preferably of at least 340 m$^2$/g. According to one or more embodiments, the porous support has a specific surface of less than 400 m$^2$/g. Such a selection of the specific surface makes it possible to obtain a preferential number of surface hydroxyls which are the sites of adsorption of the organosilicon compounds.

The porous support used for the preparation of the trapping mass additionally has a grain density of at least 1.15 g/ml and preferably of at least 1.20 g/ml. According to one or more embodiments, the porous support exhibits a grain density of between 1.20 and 1.50 g/ml.

According to one or more embodiments, the porous support used for the preparation of the trapping mass has a monomodal pore size distribution. According to the invention, the pores of the porous support have a mean diameter of less than 6.5 nm, preferably of less than or equal to 6 nm. According to one or more embodiments, the pores of the porous support exhibit a mean size of between 1 nm and 6 nm, preferably between 3 nm and 6 nm, very preferably between 5 and 6 nm.

According to one or more embodiments, the porous support used for the preparation of the trapping mass has a total pore volume (TPV) of between 0.15 cm$^3$/g and 0.6 cm$^3$/g, preferably between 0.2 cm$^3$/g and 0.5 cm$^3$/g. According to one or more embodiments, at least 80%, preferably at least 85% and more preferably still at least 90% of the total pore volume corresponds to the volume of the pores with a diameter of less than 10 nm.

Surprisingly, such a selection of size of pores makes it possible to increase the trapping capacity of the trapping mass in silicon compounds and in particular for organosilicon compounds. Without being committed to a particular theory, it appears that such small pores might make it possible to better retain the entities by a confinement effect which would be additional to the conventional mechanism.

According to one or more embodiments, the porous support used for the preparation of the trapping mass is provided in the bead form or in the form of extrudates of cylindrical, hollow cylinder, cartwheel, trilobe or multilobe shape or any other geometric shape used by a person skilled in the art.

According to one or more embodiments, the trapping mass and/or the porous support used for the preparation of the trapping mass exhibit(s) a single pellet crushing (SPC) of at least 0.68 daN/mm and/or a crushing strength (CS) of at least 1 MPa.

The method of measurement of the single pellet crushing (SPC) consists in measuring the maximum compressive form which a shaped particle (such as an extrudate) can withstand before it breaks, when the product is placed between two planes moving at the constant speed of 5 cm/min. The compression is applied perpendicularly to one of the generatrixes of the particle, and the single pellet crushing is expressed as the ratio of the force to the length of the generatrix of the particle.

The method of measurement of the crushing strength (CS) consists in subjecting a certain amount of shaped particles (such as extrudates) to an increasing pressure above a sieve and in recovering the fines resulting from the crushing of the particles. The crushing strength corresponds to the force exerted in order to obtain a level of fines representing 0.5% of the weight of the particles subjected to the test.

The trapping mass according to the invention can be prepared by any method known to a person skilled in the art and more particularly according to the methods described below. For example, it is possible to prepare the trapping mass according to the invention by means of a preparation process comprising the following stages:
  a) a porous alumina-based support is provided;
  b) an aqueous solution containing at least one dissolved metal M precursor, the metal M being chosen from the metals from groups VIB and VIIIB, and optionally containing a phosphorus compound, is prepared;
  c) the solution obtained on conclusion of stage b) is impregnated on the porous support resulting from stage a);
  d) the impregnated support resulting from stage c) is allowed to mature, for example in a closed enclosure which is optionally saturated with water and/or at a temperature of between 20° C. and 60° C. and/or for a period of time of between 0.5 h and 8 h;
  e) the solid resulting from stage d) is dried, for example at a temperature of between 70° C. and 250° C.

According to one or more embodiments, the metal from group VIB, the metal from group VIIIB and optionally the phosphorus compound are impregnated together or separately, each impregnation stage c) preferably being followed by a maturation stage d).

According to one or more embodiments, each maturation stage d) is followed by a drying stage e).

According to one or more embodiments, each drying stage e) is followed by a calcination stage f).

According to one or more embodiments, the preparation process comprises only a single impregnation stage c) and/or maturation stage d) and/or drying stage e) and/or calcination stage. According to one or more embodiments, the preparation process comprises only a single impregnation stage c), maturation stage d), drying stage e) and calcination stage.

In stage a), the porous alumina-based support can be synthesized by various methods, for example to form a flash alumina or a gel alumina, which are known to a person skilled in the art.

A first method for the synthesis of the support made of alumina is as follows. A precursor of aluminum trihydroxide Al(OH)3 type, otherwise called hydrargillite or gibbsite, for example resulting from the process commonly called "Bayer" process, is dehydrated, preferably rapidly (e.g., flash treatment). The dehydrated precursor is shaped, for example by granulation, then it is subjected to a hydrothermal treatment and finally to a calcination in order to obtain the desired alumina. These methods are described in more detail, for example in the part entitled "Alumina" by P. Euzen, P. Raybaud, X. Krokidis, H. Toulhoat, J. L. Le Loarer, J. P. Jolivet and C. Froidefond in "Handbook of Porous Solids" (F. Schuth, K. S. W. Sing and J. Weitkamp, Wiley-VCH, Weinheim, Germany, 2002). These methods make it possible to produce an alumina commonly called "flash alumina".

A second method for the synthesis of the support made of alumina is as follows. A gel is first of all obtained from a precursor of gamma aluminum oxide hydroxide AlO(OH) type, otherwise called boehmite, exhibiting specific surfaces of between 150 and 600 m²/g. The boehmite gel can, for example, be obtained by precipitation of basic and/or acidic solutions of aluminum salts caused by a change in pH or any other method known to a person skilled in the art. According to one or more embodiments, the gel is obtained by a sequence of hydrolysis and condensation reactions of aluminum alkoxides. The gel can subsequently be shaped, for example by kneading-extrusion. Then a series of thermal or hydrothermal treatments of the product is carried out, resulting in the production of the alumina. This method is also described in the part entitled "Alumina" by P. Euzen, P. Raybaud, X. Krokidis, H. Toulhoat, J. L. Le Loarer, J. P. Jolivet and C. Froidefond in "Handbook of Porous Solids" (F. Schuth, K. S. W. Sing and J. Weitkamp, Wiley-VCH, Weinheim, Germany, 2002). This method makes it possible to produce an alumina commonly called "gel alumina".

The porous solid support according to the invention may comprise impurities. The porous solid support according to the invention may comprise, for example, sodium and/or sulfur, according to the synthesis route chosen. The content by weight of the porous solid support in sodium oxide $Na_2O$ can be of between 0 ppm by weight and 5000 ppm by weight, preferentially between 100 ppm by weight and 5000 ppm by weight and more preferentially between 1000 ppm by weight and 5000 ppm by weight. The content by weight of the porous solid support in sulfur can be of between 0% and 1% by weight, preferentially between 0% and 0.5% by weight and more preferentially still between 0% and 0.25% by weight (e.g. between 0.01% and 0.2% by weight).

Advantageously, stage b) is carried out by adjusting the amounts of precursors according to the amount of metal desired on the mass in the final state. All the types of metal precursors available can be used, alone or as a mixture: carbonates, hydroxides, nitrates, hydroxy-nitrates, chlorides, acetates, citrates. Preferably, the precursors are chosen from carbonates, hydroxides, nitrates, hydroxy-nitrates. More preferably still, the precursors are hydroxides.

According to one or more embodiments, the impregnation solution also contains a precursor of a phosphorus compound. Preferably, the impregnation solution contains phosphoric acid. The phosphorus content is adjusted, without, however, limiting the scope of the invention, so as to form a dissolved mixed compound, for example molybdenum-phosphorus or molybdenum-nickel-phosphorus. These mixed compounds can be heteropolyanions. According to one or more embodiments, the molar ratio of the phosphorus to the molybdenum is of between 0.001 and 2 or between 0.01 and 1, preferably between 0.02 and 0.75 and more preferably still between 0.05 and 0.6.

According to one or more embodiments, hydrogen peroxide is added to the impregnation solution. The hydrogen peroxide content is adjusted, without, however, limiting the scope of the invention, so as to form a compound which is dissolved and/or on the substrate, for example molybdenum-nickel. These compounds can be heteropolyanions. According to one or more embodiments, the hydrogen peroxide/Mo molar ratio is of between 0.01 and 2, preferably between 0.05 and 1 and more preferentially between 0.1 and 0.75.

In a preferred alternative form of the preparation process, during stage c), the metal precursor solution is introduced by dry impregnation.

The maturation of the impregnated support resulting from stage c), for example in the closed enclosure which is optionally saturated with water, is preferentially carried out during stage d) at a temperature of between 25° C. and 50° C. for a period of time of between 1 h and 4 h. The drying of the solid resulting from stage c) or d), during stage e), is preferentially carried out between 70° C. and 130° C. and more preferably between 70° C. and 110° C., under a dry or humid gas stream. According to one or more embodiments, the solid resulting from stage d) is dried under dry or humid air. Preferably, during stage d), the solid is dried under air containing a relative humidity at 25° C. of between 10% and 80%, preferably between 15% and 50%.

According to one or more embodiments, the solid resulting from stage e) is calcined. The calcination of the solid resulting from stage e) is preferentially carried out under a dry or humid gas stream at a temperature of between 300 and 600° C. According to one or more embodiments, the solid resulting from stage e) is calcined under dry or humid air. Preferably, during the calcination stage f), the solid is calcined under air containing a relative humidity at 25° C. of between 10% and 80%, preferably between 15% and 50%. According to one or more embodiments, the solid obtained on conclusion of stage e) is calcined under air at a temperature of between 300 and 600° C., preferably at a temperature of between 300 and 500° C., such as between 300 and 450° C. or between 350 and 500° C.

According to one or more embodiments, the trapping mass in the oxide state resulting from stage f) or the solid resulting from stage e) is subjected to a (final) sulfidation stage g) in order to be in the active form in order to hydrogenate the feedstock to be treated and to limit the formation of coke and/or to reduce the rate of coke formation. This sulfidation method can be carried out by any method resulting in the formation of metal sulfide. Sulfur is generally supplied by hydrogen sulfide or any organosulfur precursor known to a person skilled in the art, coming such as, for example, DMS (dimethyl sulfide) or DMDS (dimethyl disulfide).

According to one or more embodiments, the sulfidation stage is carried out in the gas phase ex situ or in situ; preferably, it is carried out in the gas phase in situ, that is to say in the trapping unit. It is understood that the sulfidation stage can be carried out in the liquid phase.

According to one or more embodiments, the trapping mass in the oxide state is sulfided by means of hydrogen sulfide as a mixture with molecular hydrogen. According to one or more embodiments, the proportion of hydrogen sulfide is at most 25% by weight, preferably at most 20% by weight and more preferably still at most 15% by weight.

According to one or more embodiments, the trapping mass in the oxide state is sulfided in the presence of molecular hydrogen and of at least one sulfur compound, for example diluted in a liquid hydrocarbon. Preferably, the hydrocarbon used for the sulfidation is based on n-heptane. Preferably, the sulfur compound is DMS or DMDS, at a level of 0% to 10% by weight, preferably of 0.5% to 7% by weight and more preferably still of 1% to 5% by weight. According to one or more embodiments, the liquid hydrocarbon is stripped beforehand with nitrogen. The liquid mixture (liquid hydrocarbon and sulfur compound) generally becomes gaseous at the sulfidation temperature.

According to one or more embodiments, the sulfidation stage g) is carried out with a ratio by volume of the molecular hydrogen to the sulfidation solution of between 0.1 and 1000 Nm³/m³, preferably between 1 and 750 Nm³/m³ and more preferably between 10 and 500 Nm³/m³.

According to one or more embodiments, the sulfidation stage g) is carried out at an absolute pressure of between 0.1 MPa and 20 MPa, preferentially between 0.5 MPa and 10 MPa and more preferentially between 1 MPa and 5 MPa. According to one or more embodiments, if stage g) is carried out in situ, it is preferentially carried out at the same pressure as that of the stage of use of the trapping mass.

According to one or more embodiments, the sulfidation stage g) is carried out at a temperature of between 30° C. and 500° C., preferably between 150° C. and 450° C. and more preferably still between 200° C. and 400° C.

According to one or more embodiments, the sulfidation stage g) is carried out at an LHSV (Liquid Hourly Space Velocity) of between 0.1 h$^{-1}$ and 50 h$^{-1}$, preferably between 0.5 h$^{-1}$ and 20 h$^{-1}$ and more preferably between 1 h$^{-1}$ and 10 h$^{-1}$. "LHSV" is understood to mean the liquid hourly space velocity of the sulfidation charge (liquid mixture) with respect to the volume of the trapping mass, that is to say the volume of the liquid charge divided by the reactor volume and per hour. The reactor volume comprises the volume of the trapping mass and the "empty" volume between the grains.

According to one or more embodiments, the sulfidation stage g) is carried out at a GHSV (Gas Hourly Space Velocity) of between 10 h$^{-1}$ and 5000 h$^{-1}$, preferably between 50 h$^{-1}$ and 2000 h$^{-1}$ and more preferably between 100 h$^{-1}$ and 1000 h$^{-1}$. "GHSV" is understood to mean the gas hourly space velocity of the sulfidation charge (gas mixture) with respect to the volume of the trapping mass, that is to say the volume of the gas charge divided by the reactor volume and per hour.

The trapping mass according to the invention, which can be prepared as described above, can advantageously be used as mass for trapping silicon compounds.

Another subject matter of the present invention is a process for trapping silicon compounds and in particular organosilicon compounds present in a gaseous or liquid feedstock using the trapping mass according to the invention.

The gaseous or liquid feedstock to be treated can contain silicon compounds, in different forms. For example, silicon can be found in inorganic form, that is to say silica, and in organic form. In organic form, the silicon can be contained in polymers, for example polydimethylsiloxane, or in smaller molecules, such as siloxanes, which are linear or cyclic, silanes, ethoxysilanes, silanols or silanediols, and the like. The concentration of silicon compounds in the gaseous or liquid feedstock to be treated can be variable. The gaseous feedstock to be treated can preferentially contain between 10 ng and 1 g of silicon per Nm³ of gas. The liquid feedstock to be treated can preferentially contain between 10 ng and 40 g, indeed even up to 100 g, of silicon per m³ of liquid. As silicon in its various forms, in particular organic forms, is harmful for reasons of efficiency of the treatments of these feedstocks, it can advantageously be removed by virtue of the use of the trapping mass according to the invention, or at least its content can be reduced. Finally, the feedstock to be treated can contain other elements, such as sulfur, nitrogen or chlorine, in different forms. In particular, the sulfur can be present in the form of organosulfur compounds, for example in the form of mercaptans, sulfides, disulfides or thiophene compounds. The sulfur content of the feedstock can be of between 0% by weight and 10% by weight, the nitrogen content can be of between 0% by weight and 10% by weight and the chlorine content can be of between 0% by weight and 1% by weight. Advantageously, neither the nitrogen nor the sulfur nor the chlorine which may be present in the feedstock to be treated causes losses in performance quality of the trapping masses of the invention.

The use of the trapping mass according to the invention is particularly suitable for the treatment of liquid or gaseous feedstocks of petroleum origin and their derivatives, in particular for the treatment of liquid or gaseous feedstocks of conversion units and advantageously of thermal conversion units. The use of the trapping mass according to the invention is particularly suitable for the treatment of liquid or gaseous feedstocks resulting from the degradation of biomass or of manufactured products, such as plastics. It is common for such feedstocks to contain silicon compounds. The gaseous or liquid feedstock to be treated in the process according to the invention can advantageously be chosen from the group consisting of combustion flue gases, synthesis gas, natural gas, natural gas condensates, oil or crude oils, liquid or gaseous petroleum cuts, liquid hydrocarbon cuts from refineries or petrochemical plants, effluents resulting from Fischer-Tropsch synthesis processes (e.g. XTL, such as Gas-To-Liquid and/or Biomass-To-Liquid), petrochemical intermediates, oils resulting from the pyrolysis of biomass or plastics, biogas, coker or catalytic cracking (or FCC for Fluid Catalytic Cracking) gasolines, and their mixtures. According to one or more embodiments, the gaseous or liquid feedstock to be treated in the process according to the invention is advantageously chosen from the group consisting of combustion flue gases, synthesis gas, natural gas, natural gas condensates, crude oils and liquid hydrocarbon cuts from refineries or petrochemical plants, Fischer-Tropsch condensates, oils resulting from the pyrolysis of biomass or plastics, biogas and their mixtures. According to one or more embodiments, the feedstock is a coker or FCC gasoline, such as a C5-250° C. gasoline cut resulting from an FCC catalytic cracking refining process or resulting from a coking unit.

According to one or more embodiments, the combustion flue gases are produced in particular by the combustion of hydrocarbons, of biogas and of coal in a boiler or by a combustion gas turbine, for example with the aim of producing electricity. These flue gases can comprise, by volume, between 50% and 80% of nitrogen, between 5% and 40% of carbon dioxide, between 1% and 20% of oxygen, and potentially impurities, such as SOX and NON.

According to one or more embodiments, the synthesis gas is a gas containing carbon monoxide CO, molecular hydrogen $H_2$ (e.g., in an $H_2/CO$ molar ratio generally equal to approximately 2±1), water vapor (e.g., generally at saturation), methane and carbon dioxide $CO_2$ (for example, at a content generally of approximately 10%±5% by volume). The synthesis gas can additionally contain sulfur-comprising impurities ($H_2S$, COS, and the like), nitrogen-comprising impurities ($NH_3$, HCN, and the like) and halogen-comprising impurities.

According to one or more embodiments, the natural gas consists predominantly of gaseous hydrocarbons but can contain several of the following acidic compounds: carbon dioxide $CO_2$, hydrogen sulfide $H_2S$, mercaptans, carbon oxysulfide COS and carbon disulfide $CS_2$. The content of the natural gas in these acidic compounds is highly variable and can range from 0% to 40% by volume for the $CO_2$ and the $H_2S$.

According to one or more embodiments, the natural gas condensates consist of liquid hydrocarbons, the production of which is associated with the production of natural gas. These complex liquid mixtures are very similar to light crude oils.

Mention may in particular be made, among the liquid hydrocarbons from refineries, of LPGs (C3-C4 cut), naphthas (C5-C8 cut), kerosenes and diesel oils. Mention may in particular be made, among the liquid hydrocarbons from petrochemical plants, of LPGs (C3-C4 cut) and gasolines from cracking and steam cracking (or Pyrolysis Gasoline, also called PyGas).

Mention may in particular be made, among the oils resulting from the pyrolysis of biomass or of plastics, of the oils, advantageously in liquid form at ambient temperature, resulting from the pyrolysis of plastics, preferably of plastic waste originating in particular from collection and sorting channels. According to one or more embodiments, the oils resulting from the pyrolysis of biomass or of plastics comprise a mixture of hydrocarbon compounds, in particular paraffins, monoolefins and/or diolefins, naphthenes and aromatics, said hydrocarbon compounds preferably having a boiling point of less than 700° C. and preferably of less than 550° C. The plastics pyrolysis oil can comprise impurities, such as metals, in particular silicon and iron, or halogenated compounds, in particular chlorinated compounds.

According to one or more embodiments, biogas is a gas produced by the methanization or also the fermentation of animal or vegetable organic matter in the absence of oxygen. It can be produced naturally, such as, for example, in landfills containing organic waste, or artificially in methanizers or digesters supplied with animal manure, organic or agricultural waste, or sludges from water treatment plants. Biogas consists predominantly (e.g., at least 50% by volume) of methane and $CO_2$, the proportion of which varies according to the origin of the starting material used.

In the process for trapping silicon compounds in a gaseous or liquid feedstock according to the invention, said feedstock is brought into contact with the trapping mass according to the invention. This contacting operation can preferably be carried out by injecting the feedstock to be treated into a reactor containing the trapping mass in the form of a fixed bed.

The stage of bringing the feedstock to be treated into contact with the trapping mass in the process according to the invention can be carried out at a temperature of between 20° C. and 500° C., preferentially between 100° C. and 450° C. and more preferentially between 200° C. and 400° C., such as between 220 and 370° C. (e.g. 300±20° C.). In addition, said contacting operation can be carried out at an absolute pressure of between 0.1 MPa (1 bar) and 10 MPa (100 bars), preferably between 0.5 MPa (5 bars) and 15 MPa (150 bars) or 10 MPa (100 bars) and more preferentially between 1 MPa (10 bars) and 5 MPa (50 bars), e.g. between 3 (30 bars) and 4.5 MPa (45 bars).

The stage of bringing the feedstock to be treated into contact with the trapping mass can be carried out with an LHSV of between 0.1 $h^{-1}$ and 50 $h^{-1}$, preferably between 0.5 $h^{-1}$ and 20 $h^{-1}$ and more preferably between 1 $h^{-1}$ and 10 $h^{-1}$, such as between 3 $h^{-1}$ and 4.5 $h^{-1}$ (e.g. 4±0.2 $h^{-1}$). The stage of bringing the feedstock to be treated into contact with the trapping mass can be carried out with a GHSV of between 10 $h^{-1}$ and 5000 $h^{-1}$, preferably between 50 $h^{-1}$ and 2000 $h^{-1}$ and more preferably still between 100 $h^{-1}$ and 1000 $h^{-1}$, such as between 300 $h^{-1}$ and 450 $h^{-1}$ (e.g. 400±20 $h^{-1}$).

Surprisingly, the applicant company has also identified that the removal of the organosilicon entities could be advantageously carried out by reducing the liquid or gas hourly space velocity and more particularly by operating at an LHSV<5 $h^{-1}$ or at a GHSV<500 $h^{-1}$. Advantageously, the trapping process according to the invention is improved compared to the prior art because said process makes it possible to significantly improve the effectiveness of the mass in trapping silicon, an impurity of the feedstock, while simplifying and minimizing the production operations and costs. Effectiveness of the mass is understood to mean significantly increased performance qualities in trapping capacity (more than 50% capacity). The gain in performance quality (the increase in the capacity of the mass) translates into significant advantages. The gain in performance quality makes it possible to increase the cycle time of the mass and simplifies the process and thus reduces the operating costs. The gain in performance quality also makes it possible to better protect the catalysts of the downstream processes (in particular those of the hydrodesulfurization, hydrotreating or reforming processes) and also results in their lifetime being improved, which simplifies the process and further reduces the operating costs.

According to one or more embodiments, the LHSV is less than or equal to 4.5 $h^{-1}$ and preferably the LHSV is less than or equal to 4.25 $h^{-1}$. According to one or more embodiments, the LHSV is less than or equal to 4 $h^{-1}$, preferably less than or equal to 3 $h^{-1}$ and preferably less than or equal to 2 $h^{-1}$. According to one or more embodiments, the LHSV is of between 0.1 and 4.9 $h^{-1}$, preferably between 0.15 and 4.5 $h^{-1}$, preferably between 0.2 and 4.25 $h^{-1}$ and more preferably still between 0.25 and 4 $h^{-1}$.

According to one or more embodiments, the GHSV is less than or equal to 450 $h^{-1}$ and preferably the GHSV is less than or equal to 425 ft'. According to one or more embodiments, the GHSV is less than or equal to 400 $h^{-1}$, preferably less than or equal to 300 $h^{-1}$ and preferably less than or equal to 200 $h^{-1}$. According to one or more embodiments, the GHSV is of between 10 and 490 $h^{-1}$, preferably between 150 and 450 $h^{-1}$, preferably between 20 and 425 $h^{-1}$ and more preferably still between 25 and 400 $h^{-1}$.

This is because the applicant company has identified that, below 5 $h^{-1}$ for a liquid feedstock and 500 $h^{-1}$ for a gaseous feedstock, the decrease by one LHSV or GHSV unit made it possible to grow by 5-20% in trapping capacity whereas, above these values, it only makes it possible to grow by less than 5% in trapping capacity. Surprisingly, there is a threshold value for LHSV and GHSV above which its value has only a slight impact. This means that, below a certain contact time (the contact time being inversely proportional to the hourly space velocity), its value has little impact on the trapping capacity of the trapping mass. Conversely, beyond a threshold value, increasing the contact time makes it possible to trap more silicon.

During the stage of bringing the feedstock to be treated into contact with the trapping mass, molecular hydrogen in gaseous form can be added to the feedstock. For example, the ratio by volume of the molecular hydrogen to the liquid feedstock to be treated can be between 0.1 and 1000 $Nm^3/m^3$, preferably between 1 and 750 $Nm^3/m^3$ and more preferably between 10 and 500 $Nm^3/m^3$, such as between 100 and 200 $Nm^3/m^3$ (e.g. 150±10 $Nm^3/m^3$). In the case of a gaseous feedstock, molecular hydrogen can be added so as to obtain a $PpH_2$ of between 0.01 MPa (0.1 bar) and 10 MPa (100 bar), preferably between 0.1 MPa (1 bar) and 5 MPa (50 bars).

Surprisingly, the applicant company has also identified that the removal of organosilicon entities could be advantageously carried out in the absence of hydrogen (for example for the treatment of combustion flue gases). Thus, the trapping process according to the invention makes it possible to effectively trap silicon, an impurity of the feedstock, while improving the atomic economy, simplifying the process, reducing the equipment necessary for the operation of the process, and reducing the energy costs, the production costs and the operating costs. According to one or more embodiments, the stage of removal of silicon by contact with a rejuvenated trapping mass is carried out in the absence of hydrogen. In the present patent application, the term "in the absence of hydrogen" is synonymous with: in the case of a liquid feedstock to be treated, a ratio by volume between the molecular hydrogen and the feedstock of less than 0.1 $Nm^3/m^3$, preferably of less than 0.01 $Nm^3/m^3$, in a preferred way of less than 0.001 $Nm^3/m^3$ and more preferably still of less than 0.0001 $Nm^3/m^3$; and, in the case of a gaseous feedstock to be treated, a partial pressure of molecular hydrogen $PpH_2$ of less than 0.01 MPa, preferably of less than 1 kPa, in a preferred way of less than 0.1 kPa and more preferably still of less than 0.01 kPa.

Prior to bringing the liquid or gaseous feedstock to be treated into contact with the trapping mass, the gaseous or liquid feedstock can be pretreated. Said pretreatment can consist of a heating or a cooling, of a compression or of an expansion (in the case of a gaseous feedstock), and/or of a purification treatment making it possible to remove or to reduce the content of the feedstock in a compound considered undesirable.

The contact of the feedstock with the trapping mass advantageously makes it possible to trap the silicon compounds contained in the feedstock to be treated and to obtain an effluent having a reduced content of silicon compounds compared with the content of the initial feedstock, indeed even to completely remove the silicon compounds from the feedstock.

According to one or more embodiments, the contact of the feedstock with the trapping mass makes it possible to simultaneously remove the silicon compounds and certain other impurities, such as, for example, sulfur compounds and/or nitrogen compounds.

Examples

Four trapping masses (M1, M2, M3, M4) were prepared in the following way:
a) a porous alumina-based support is provided;
b) an impregnation solution is prepared. 60% of the total volume of water of the impregnation solution is poured into a round-bottomed flask. The desired amount of phosphoric acid is subsequently added. The molybdenum and nickel precursors are successively added to the solution while stirring the mixture. This solution is left stirring and at reflux at 90° C. When the solution has become clear, reflux is halted. When the solution is at ambient temperature, water is added in order to obtain 95% of the targeted total volume of the impregnation solution.
c) the porous support is impregnated by slow spraying with said solution prepared in the preceding stage b);
d) the product obtained in the preceding stage c) is left maturing in a closed vessel at ambient temperature and for 3 hours;
e) the material obtained in the preceding stage d) is dried at 90° C. for 3 h;
f) the material obtained in the preceding stage e) is calcined in a tube furnace at 450° C. under a humid atmosphere for 45 min.

The nickel, molybdenum and phosphorus contents of the trapping masses were measured by X-ray fluorescence on an Axios mAX device from PANanalytical. The TBD, the mean diameter of the pores and the specific surface of the trapping masses M1, M2, M3 and M4 are given in table 1 below. The grain density and mean diameter of the pores were determined from the mercury porosimetry results and the specific surface from the $N_2$ adsorption isotherm at 77K (cf. Rouquerol F., Rouquerol J. and Sing K., "Adsorption by Powders and Porous Solids: Principles, Methodology and Applications", Academic Press, 1999).

All the values cited above are given in table 1 indicating below the NiO, $MoO_3$ and P contents, the grain density, the mean diameter of the pores and the BET specific surface of the trapping masses M1 to M4.

TABLE 1

| Trapping mass | NiO (% by weight) | $MoO_3$ (% by weight) | P (% by weight) | $d_{grain}$ (g/ml) | $d_{pores}$ (nm) | $S_{BET}$ ($m^2/g$) |
|---|---|---|---|---|---|---|
| M1 (according to the invention) | 0.80 | 3.71 | 1.88 | 1.37 | 5.7 | 319 |
| M2 (comparative) | 0.94 | 4.32 | 2.80 | 1.40 | 6.7 | 314 |
| M3 (comparative) | 1.13 | 5.64 | 1.92 | 1.18 | 5.8 | 312 |
| M4 (comparative) | 1.06 | 4.55 | 2.93 | 1.04 | 7.3 | 313 |

The trapping mass M1 is in accordance with a trapping mass according to the invention. The trapping mass M2 has pores with a mean size greater than that of the pores of the trapping mass according to the invention. The trapping mass M3 has a grain density lower than that of the trapping mass according to the invention. The trapping mass M4 has pores with a mean size greater than that of the pores of the trapping mass according to the invention and a grain density lower than that of the trapping mass according to the invention.

The four masses were subsequently evaluated in trapping of silicon compounds in a feedstock doped with 50 ppm by weight of Si resulting for 50% from hexamethyltricyclosiloxane (D3) and 50% from octamethyltetracyclosiloxane (D4). The feedstock is a gasoline, the density and the composition of which are described in detail in table 2. The trapping was carried out at 300° C. under 4 MPa (40 bars) at an LHSV of 4 $h^{-1}$ and in the presence of $H_2$ with an $H_2$/feedstock ratio of 150 $Nm^3/m^3$ through a fixed bed of 40 $cm^3$. Samples are withdrawn twice daily and analyzed by X-ray fluorescence in order to determine their silicon content. The test is halted when the concentration at the outlet in the effluent is equivalent to 50% of the concentration at the inlet of the feedstock and a material balance with regard to the silicon is carried out: the difference between what entered the column and what exited therefrom corresponds to the weight of silicon trapped on the trapping masses.

The composition of the gasoline before doping with silicon is presented in table 2.

TABLE 2

| Density | g/ml | 0.79 |
|---|---|---|
| Stotal | mg/kg | 264 |
| Ntotal | mg/kg | 63 |
| BrN* | g/100 g | 58 |
| MAV** | g/mg | 5 |
| HC composition | — | — |
| n-Paraffins | wt % | 3.7 |
| Isoparaffins | wt % | 21.2 |
| Naphthenes | wt % | 10.9 |
| Olefins | wt % | 29.8 |
| Aromatics | wt % | 34.4 |

*bromine number
**maleic anhydride value

The silicon content as % by weight, expressed in grams of trapped Si per 100 grams of the fresh trapping masses M1 to M4, is presented in table 3.

TABLE 3

| Trapping mass | wSi (g) |
|---|---|
| M1 (according to the invention) | 2.32 |
| M2 (comparative) | 2.13 |
| M3 (comparative) | 2.02 |
| M4 (comparative) | 1.89 |

The trapping mass M1 (in accordance with the invention) is the most effective trapping mass: the mass M1 is that which traps the greatest weight of silicon. The mass M2 (comparative), the size of the pores of which is greater than that claimed according to the invention, trapped 9% less silicon than the mass M1. The mass M3 (comparative), the grain density of which is lower than that claimed according to the invention, traps 15% less silicon than the mass M1. The mass M4 (comparative), the size of the pores of which is greater than that claimed according to the invention and a grain density of which lower than that claimed according to the invention, traps 23% less silicon than the mass M1.

These results show that the pore diameter and the grain density both independently contribute to improving the silicon trapping capacity of the trapping mass.

The invention claimed is:

1. A mass for trapping silicon compounds, comprising: a porous alumina-based support and at least one metal chosen from the metals from groups VIB and VIIIB, wherein the porous support exhibits a grain density of at least 1.20 g/ml, a specific surface of at least 300 m$^2$/g, and pores with a mean size of less than 6.5 nm, as determined by mercury porosimetry.

2. The trapping mass as claimed in claim 1, wherein the trapping mass exhibits a grain density of at least 1.25 g/ml.

3. The trapping mass as claimed in claim 1, wherein the trapping mass exhibits a specific surface of at least 310 m$^2$/g.

4. The trapping mass as claimed in claim 1, wherein the trapping mass exhibits pores with a mean size of less than or equal to 6.0 nm.

5. The trapping mass as claimed in claim 1, wherein the trapping mass exhibits a monomodal pore size distribution.

6. The trapping mass as claimed claim 1, wherein the trapping mass exhibits a content of less than 10% by weight of metal from group VIB, expressed as oxide, and/or a content of less than 5% by weight of metal from group VIIIB, expressed as oxide.

7. The trapping mass as claimed in claim 1, wherein the trapping mass exhibits a content of less than 15% by weight of P, expressed as oxide $P_2O_5$.

8. The trapping mass as claimed in claim 1, wherein the trapping mass exhibits a total pore volume of between 0.15 cm$^3$/g and 0.6 cm$^3$/g.

9. A process for the preparation of a mass for trapping silicon compounds, comprising the following stages:

a) providing a porous alumina-based support exhibiting a grain density of at least 1.15 g/ml, a specific surface of at least 330 m$^2$/g and pores with a mean size of less than 6.5 nm, as determined by mercury porosimetry;

b) preparing an aqueous solution containing at least one dissolved metal M precursor, the metal M being chosen from the metals from groups VIB and VIIIB;

c) impregnating the porous support resulting from stage a) with the solution obtained in stage b);

d) maturing the impregnated support resulting from stage c); and e) drying the matured, impregnated support resulting from stage d).

10. The preparation process as claimed in claim 9, wherein the porous support exhibits a grain density of at least 1.20 g/ml.

11. The preparation process as claimed in claim 9, wherein the porous support exhibits a specific surface of at least 340 m$^2$/g.

12. The preparation process as claimed in claim 9, wherein the porous support exhibits pores with a mean size of less than or equal to 6.0 nm.

13. The preparation process as claimed in claim 9, wherein the trapping mass comprises a porous alumina-based support and at least one metal chosen from the metals from groups VIB and VIIIB, and the porous support exhibits a grain density of at least 1.20 g/ml, a specific surface of at least 300 m$^2$/g, and pores with a mean size of less than 6.5 nm.

14. A process for trapping silicon compounds in a gaseous or liquid feedstock, comprising bringing the feedstock into contact with a trapping mass as claimed in claim 1.

15. The trapping process as claimed in claim 14, wherein the contacting of the feedstock with the trapping mass is carried out at a temperature of between 20° C. and 500° C., an absolute pressure of between 0.1 MPa and 20 MPa, and a liquid hourly space velocity of between 0.1 h$^{-1}$ and 50 h$^{-1}$ or a gas hourly space velocity of between 10 h$^{-1}$ and 5000 h$^{-1}$.

16. The trapping mass as claimed in claim 1, wherein content of metal from group VIB, expressed as oxide, is between 0.1% and 10% by weight, with respect to the total weight of the trapping mass.

17. The trapping mass as claimed in claim 1, wherein the content of metal from group VIIIB, expressed as oxide, is between 0.01% and 5% by weight, with respect to the total weight of the trapping mass.

18. The trapping mass as claimed in claim 1, wherein the trapping mass exhibits a content of P, expressed as oxide $P_2O_5$, of between 0.1% and 15% by weight, with respect to the total weight of the trapping mass.

19. The trapping mass as claimed in claim 1, wherein the trapping mass exhibits a specific surface of between 310 m$^2$/g and 400 m$^2$/g.

20. The trapping mass as claimed in claim 1, wherein the trapping mass exhibits a grain density of between 1.25 g/ml and 1.60 g/ml.

* * * * *